(12) United States Patent
Gutta et al.

(10) Patent No.: US 6,424,273 B1
(45) Date of Patent: Jul. 23, 2002

(54) SYSTEM TO AID A DRIVER TO DETERMINE WHETHER TO CHANGE LANES

(75) Inventors: Srinivas Gutta, Buchanan; Miroslav Trajkovic, Ossining; Antonio Colmenarez, Peekskill, all of NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 47 days.

(21) Appl. No.: 09/822,451

(22) Filed: Mar. 30, 2001

(51) Int. Cl.[7] .............................................. G08G 1/017
(52) U.S. Cl. ...................... 340/937; 340/936; 340/435; 340/436; 340/903; 340/942
(58) Field of Search ................................ 340/937, 435, 340/903, 988, 436, 942, 936; 701/301; 348/115, 118–119, 135, 148–149

(56) References Cited

U.S. PATENT DOCUMENTS

| | | | |
|---|---|---|---|
| 4,910,591 A | * 3/1990 | Petrossian et al. .......... 358/103 |
| 5,289,321 A | * 2/1994 | Secor ........................ 359/896 |
| 5,304,980 A | 4/1994 | Maekawa | |
| 5,307,136 A | 4/1994 | Saneyoshi | |
| 5,670,935 A | * 9/1997 | Schofield et al. ........... 340/461 |
| 5,949,331 A | * 9/1997 | Schofield et al. ........... 340/461 |
| 5,699,057 A | * 12/1997 | Ikeda et al. ................. 340/937 |
| 6,218,960 B1 | * 2/2000 | Ishikawa et al. ............ 340/901 |

FOREIGN PATENT DOCUMENTS

| | | |
|---|---|---|
| EP | 1035455 A1 | 3/2000 |
| WO | WO 96/16836 | 6/1996 |
| WO | WO 96/38319 | 12/1996 |

* cited by examiner

*Primary Examiner*—Jeffery Hofsass
*Assistant Examiner*—Daniel Previl
(74) *Attorney, Agent, or Firm*—Dicran Halajian

(57) ABSTRACT

A vehicular vision system to aid a driver of a vehicle to determine whether it is safe to change lanes includes a camera having a field of view such that the field of view corresponds to at least a portion of an area proximate the vehicle. The system also includes an object identifier electrically coupled to the camera, a distance determiner which determines a distance of the object which is in the field of the camera, and a display electrically coupled to the camera which displays an image generated by the camera and provides an indication of the type of object which is in the field of view of the camera and the distance of the object from the vehicle.

20 Claims, 2 Drawing Sheets

SYSTEM TO AID A DRIVER TO DETERMINE WHETHER TO CHANGE LANES

FIELD OF THE INVENTION

This invention relates to vision systems for vehicles, and more particularly relates to vehicular vision systems which provide the vehicle operator with information to utilize when making a determination as to whether to change lanes while driving.

BACKGROUND INFORMATION

A major cause of driving accidents is a driver's inability to recognize that another vehicle is proximate the driver's vehicle, such as in the driver's blind spot, and that it is therefore unsafe to change lanes. This may be attributable to voids in coverage (i.e., blind spots) provided by mirrors that is are positioned on the driver's vehicle, and to visual interference caused by objects that are positioned in the driver's line of vision.

Prior to changing lanes, a driver traditionally checks his mirrors and blind spots. This includes the driver turning his head and/or shifting his eyes from the forward direction of travel of the vehicle. This is performed to determine whether another vehicle is proximate his vehicle. In order for the driver to safely change lanes, the driver must determine not only if a vehicle is proximate his vehicle, but the size of the vehicle and its proximity to the driver's vehicle. This can only be accomplished if the driver observes areas that are to the side and rear of his vehicle for a period of time. By observing these areas, the driver is reducing the chance of getting into an accident with a vehicle that is next to and/or behind the driver's vehicle when changing lanes. However, since the driver is not continually observing the roadway that is in front of his vehicle, the likelihood of the driver's vehicle being involved in a frontal collision increases.

It would therefore be beneficial to have a vehicular vision system which provides a view of areas proximate the driver's vehicle, which identifies the type of vehicles proximate the driver's vehicle, and which identifies the distance of each vehicle from the driver's vehicle without having the driver turn his head from the forward direction of travel.

OBJECTS OF THE SUMMARY OF THE INVENTION

It is an object of the present invention to provide a system which enables a driver to view regions to the side and rear of the driver's vehicle without having the driver turn his head from the forward direction of travel.

It is another object of the present invention to provide a system which enables a driver to identify types of vehicles located in regions proximate the driver's vehicle without having the driver turn his head from the forward direction of travel.

It is yet another object of the present invention to provide a system which enables a driver to determine a spacing (distance) of vehicles proximate the driver's vehicle without having the driver turn his head from the forward direction of travel.

It is a further object of the present invention to provide a vehicular vision system which overcomes inherent disadvantages of known vehicle vision systems.

In accordance with one form of the present invention, a vehicular vision system to aid a driver of a vehicle in determining whether it is safe to change lanes includes at least one camera having a field of view which is positioned on the vehicle such that the field of view of the camera corresponds to at least a portion of an area proximate the vehicle, a distance determiner electrically coupled to the at least one camera which determines a distance of an object from the vehicle, and a display electrically coupled to the camera which displays an image generated by the camera and provides an indication of the distance of the object from the vehicle to the driver.

A preferred form of the vehicular vision system to aid a driver of a vehicle in determining whether it is safe to change lanes, as well as other embodiments, objects, features and advantages of this invention will be apparent from the following detailed description of illustrative embodiments thereof, which is to be read in connection with the accompanying drawings.

DETAILED DESCRIPTION OF THE PREFERRED EMBODIMENT

Figure 1:
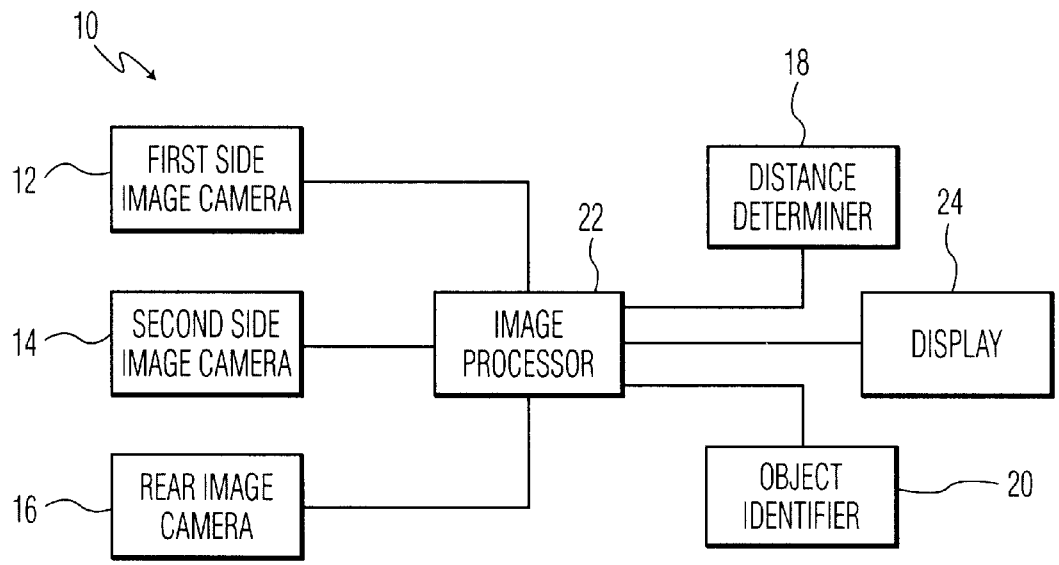
FIG. 1 is a block diagram of the vehicular vision system according to the present invention.

Referring now to the drawings, and initially to FIG. 1, the vehicular vision system 10 which aids a driver in determining whether to change lanes preferably includes first and second side image cameras 12, 14, a rear image camera 16, a distance determiner 18, and an object identifier 20. The output port of each of the first and second side image cameras, and rear image camera is electrically coupled to an image processor 22. Electrically coupled to the output port of the image processor is a display 24, the distance determiner 18 and the object identifier 20. The image processor preferably receives image signals from each of the cameras 12, 14, 16 and synthesizes a composite image output signal for viewing on the display 24. The image processor provides its output signal to the distance determiner and object identifier. The distance determiner determines distances of objects from the vehicle that are observed by the cameras, and the object identifier identifies the type of object observed by the cameras. The output signals of, the distance determiner 18 and object identifier 20 are provided to the display 24 for viewing along with the composite image generated by the cameras and image processor.

Figure 2:
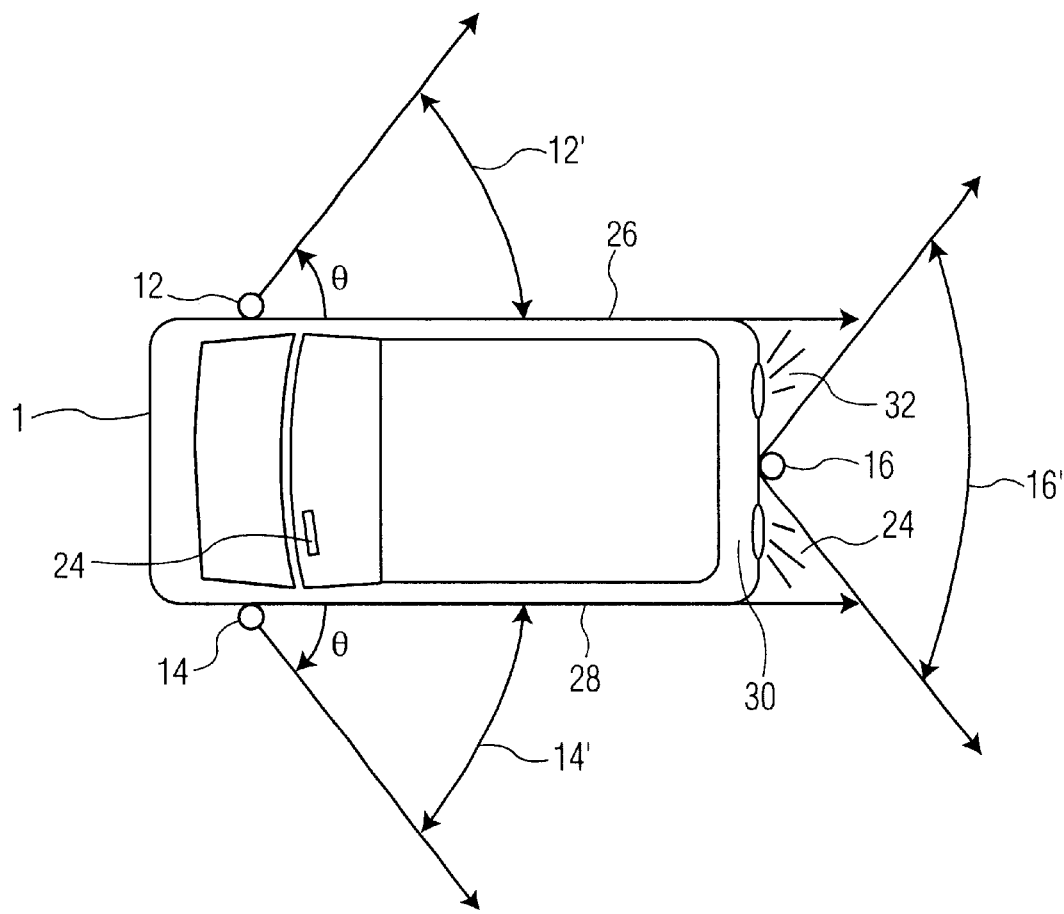
FIG. 2 is a top plan view of the positioning of cameras on a vehicle having the vehicular vision system according to the present invention.

Referring now to FIG. 2, the vehicular vision system 10 is employed in a vehicle 1, such as an automobile, truck, light-truck, sport utility, van, bus, or motorcycle for providing a driver of the vehicle with a composite side and rearward view from the vehicle by looking at only one display. The display is preferably positioned proximate the driver's forward field of view as explained below. The first and second side image cameras 12, 14 are preferably placed on a portion of the vehicle (e.g., a passenger side and driver side front portions of the vehicle, respectively) such that a rearward and sideward field of view 12', 14' is obtained for both sides of the vehicle as shown in FIG. 2. In the preferred embodiment, the first and second side image cameras 12, 14 cover an area bounded by corresponding sides 26, 28 of the vehicle 1 and which extends outwardly at an angle e defined by the field of view of each camera. While the cameras 12 and 14 are shown as having the same angle θ in FIG. 2, it is foreseen that the cameras may have different fields of view.

The rear image camera 16 is preferably placed on a rear portion 30 of the vehicle 1 with its field of view oriented such that a rearward view from the vehicle is obtained. The rear image camera preferably has a field of view which results in only very small areas 32, 34 behind the vehicle not being visible to either the rear image camera 16 or the first and second side image cameras 12, 14. The composite field of view of the cameras 12, 14, 16 is preferably large enough such that the areas 32, 34 are not large enough for a motorcycle, bicycle or other relatively small vehicle to be contained. Therefore the system will not cause the driver to falsely believe that an object is not proximate his vehicle when in fact an object is proximate the vehicle.

The images generated by the first and second side image cameras 12, 14 and the rear image camera 16 are provided to the image processor 22 (see FIG. 1) which processes the image signals generated by the cameras and provides processed image signals to the display 24 for viewing by the driver. Suitable cameras for use as the first and second side image cameras 12, 14 and the rear image camera 16 are disclosed in WO 96/38319, the entire disclosure of which is incorporated herein by reference.

Figure 3:
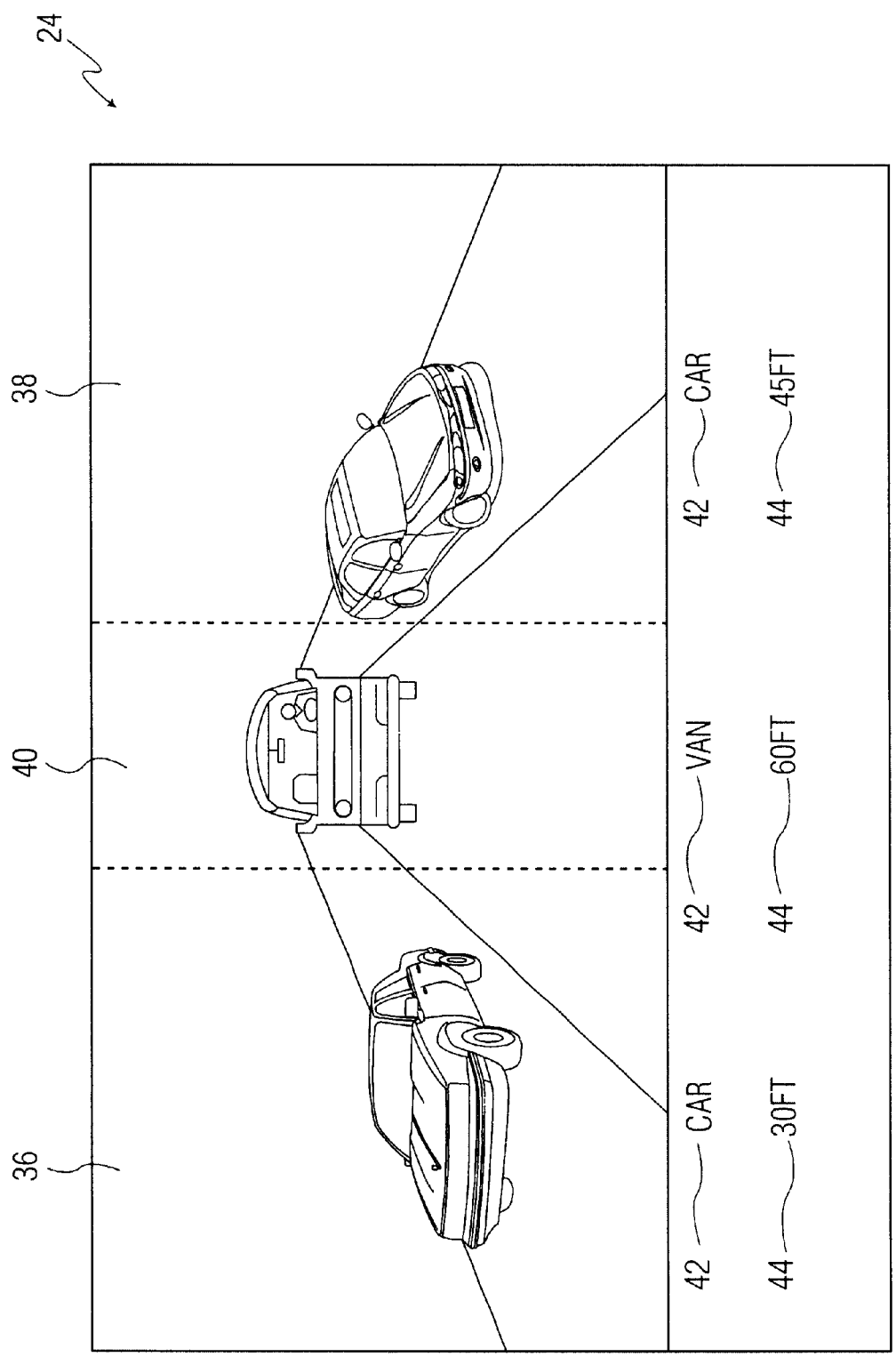
FIG. 3 is a front elevation of a display according to the present invention.

Once the images corresponding to the field of view of the cameras have been obtained by the cameras, the image signals are provided to the image processor 22 which processes the image signals and provides the image information to the distance determiner 18 and object identifier 20. Thereafter, objects in the field of view of the cameras are identified by the object identifier, and the relative distance of each object from the vehicle is determined. This information is then provided to the display 24 for viewing by the driver. The screen of the display can take any form, and a preferred form is shown in FIG. 3.

As mentioned above, the vehicular vision system includes an object identifier 20 which analyzes the images generated by the cameras 12, 14, 16 and identifies the type of objects observed by the camera. In the preferred embodiment the identification occurs by extraction and classification. The extraction of objects from the field of view is accomplished in accordance with any of a number of well-known methods, such as the methods described in Segmentation and Tracking Using Color Mixture Models, by Yogesh Raja, Stephen J. McKenna and Shaogang Gong, Proceedings of the 3$^{rd}$ Asian Conference on Computer Vision, Vol. 2, pp. 607–614, Hong Kong, China, 1998; and Statistical Foreground Modelling for Object Localization, by Josephine Sullivan, Andrew Blake and Jens Rittcher, Proceedings of the 6$^{th}$ European Conference on Computer Vision, Vol. 2, pp. 307–323, Dublin, Ireland, 2000, the entire disclosures of which are incorporated herein by reference.

Once the objects have been extracted, then classification of each object is performed. Classification can be performed in accordance with any of a number of well-known methods. In the preferred embodiment classification refers to providing descriptive information of the object extracted from the image generated by the cameras. The identification may be as simple as saying that the object is a car, bus, motorcycle, sport utility, minivan or truck. These methods are known to persons skilled in the art. A preferred method for classifying objects is described in U.S. Serial No. (unassigned) to Gutta et al entitled "Classification of Objects through Model Ensembles" filed Feb. 27, 2001; and "Pedestrian Tracking from a Moving Vehicle", by Vasanth Philomin, Ramani Duraiswami and Larry Davis, Proceedings of the IEEE Intelligent Vehicles Symposium, Vol. 1, pp. 350–355, Dearborn, USA, 2000, the entire disclosures of which are incorporated herein by reference. While the later above-identified reference discusses tracking and classification of pedestrians, the same system can be extended to classification of vehicles by a person of ordinary skill in the art.

As mentioned previously, the present invention also includes a distance determiner 18 to determine the distance of each object which is in the field of view of the cameras from the driver's vehicle. Many systems known to persons skilled in the art can provide the relative distance of an object from a vehicle such as a radar or sonar type system wherein a signal is transmitted to the object and returned to the transmitter for determination of the relative distance, and stereo cameras or a single camera wherein the images acquired from the cameras are analyzed to determine the distance of the object from the vehicle such as that disclosed in U.S. Pat. No. 5,633,705 to Asayama, entitled "Obstacle Detecting System for a Motor Vehicle"; and U.S. Pat. No. 5,304,980 to Maekawa entitled "Distance Detecting Apparatus for a Vehicle," and U.S. Pat. No. 5,307,136 to Saneyushi entitled "Distance Detection System For Vehicles," the entire disclosures of which are incorporated herein by reference. In the preferred embodiment, the distance determiner analyzes the images obtained by the cameras 12, 14, 16 to determine the distance of each object from the vehicle.

Referring now to FIG. 3, the image display device 24 is shown. The display device displays a composite image which includes a visual representation 36, 38, 40 the field of view 12', 14', 16' of the first and second side image cameras 12, 14 and the rear image camera 16 respectively, a notation as to each type 42 of object identified by the object identifier, and an indication of the distance 44 between each object being displayed an alpha-numeric form in relation to the driver's vehicle 1. The type of vehicle is relevant because a driver might want to drive more cautiously if a truck or other large vehicle is proximate his vehicle. The distance of each object from the driver's vehicle is relevant so that a driver can have an accurate measurement of the distance of each object from his vehicle rather than relying upon the driver's own visual judgement as to whether it is safe to change lanes.

The display is preferably of a size so as to be as natural as possible to the driver. This is a function of the size of the displayed image and the distance between the display and the driver. Preferably, the displayed image simulates an image reflected by a rear or side view mirror. The display is preferably positioned within the driver's physiological forward field of view, without significantly obstructing the driver's forward vision.

The display may be a direct view flat panel display, such as a back-lit or reflective liquid crystal display, a plasma display, a field emission display, a cathode ray tube electroluminescent device, light-emitting diode or deformable mirror display. The display may be mounted/attached to the dashboard, facia or header, or to the windshield at a position conventionally occupied by an interior rearview mirror. The image generated by the image processor could also be displayed using other display techniques such as to provide a projected or virtual image. Alternatively, a virtual image may be displayed on an opaque display adjacent the forward field of view, or on a view-through heads-up display in which the image is superimposed on the driver's forward field of view.

While the present invention is discussed above in connection with first and second side view cameras and a rear view camera, it is foreseen that additional cameras may be added to the vehicle to provide the driver with a more panoramic rearward view from the vehicle and so as to eliminate any non-viewable regions behind the driver's vehicle. It is also foreseen that a single camera with a very large field of view and properly positioned on the vehicle could substitute for the side and rearview cameras. It is also foreseen that an output of each camera 12, 14, 16 can be directly coupled to the display 24. In addition, the distance determiner 18 and object identifier 20 need not receive input signals from the image processor, but can receive input information required to perform their desired functions from appropriate sensors located on the vehicle.

Although illustrative embodiments of the present invention have been described above in connection with the drawings, it is foreseen that the invention is not to be limited to these precise embodiments and that various modifications can be made by persons skilled in the art without departing from the scope and spirit of the invention. For example, while it is described that the cameras are attached to the side of the vehicle, it is foreseen that the cameras can be mounted on the roof of the vehicle or embedded within the vehicular panels. In addition, while three cameras are described in the preferred embodiment, one or two specifically positioned cameras could provide the required coverage. Moreover it is foreseen that the system can provide the driver with an indication that it is now safe to change lanes to the left or the right in response to the driver activating the turning signal, based on the information provided by the cameras, object identifier and distance determiner. It is also foreseen that the system can have the capability to automatically disable the turning signal, in addition to providing an indication to the driver on the display, so as to advise the driver that it is unsafe to change lanes.

What is claimed is:

1. A vehicular vision system to aid a driver of a vehicle in determining whether to change lanes, comprising:
    at least one camera having a field of view, the at least one camera being positioned on the vehicle such that the field of view corresponds to at least a portion of an area proximate the vehicle;
    a distance determiner electronically coupled to the at least one camera which determines a distance of an object in the field of view of the at least one camera from the vehicle; and
    a display electrically coupled to the at least one camera which displays an image generated by said at least one camera and displays in alpha-numeric form the distance of the object from the vehicle which is in the field of view of the at least one camera.

2. The vehicular vision system according to claim 1 further comprising:
    an object identifier electrically coupled to the at least one camera, the object identifier identifying the object which is in the field of view of the at least one camera and determining a type of the object, said type being d-splayed as text on said display.

3. The vehicular vision system according to claim 2 wherein the type of vehicle is one of a car, truck, light-truck, van, motorcycle, sport utility vehicle, and bus.

4. The vehicular vision system according to claim 1 further comprising an image processor coupled to the at least camera for receiving a signal generated by the at least one camera which corresponds to the field of view of the camera, the image processor generating a signal which is provided to the display for displaying the field of view of the at least one camera on the display.

5. The vehicular vision system according to claim 1 wherein the at least one camera comprises first and second side image cameras and a rear image camera.

6. The vehicular vision system according to claim 1, wherein said distances determiner is configured to disable a turning signal of the vehicle in response to the distance being less than a threshold.

7. A vehicular vision system to aid a driver of a vehicle in determining whether to change lanes, comprising:
    at least one camera having a field of view, the at least one camera being positioned on the vehicle such that the field of view corresponds to at least a portion of an area proximate the vehicle;
    a distance determiner electronically coupled to the at least one camera which determines a distance of an object in the field of view of the at least one camera from the vehicle; and
    an object identifier electrically coupled to the at least one camera, the object identifier identifying the object which is in the field of view of the at least one camera and determining a type of the object for displaying said type as text.

8. The vehicular vision system according to claim 7, further comprising a display electrically coupled to the at least one camera which displays an image generated by said at least one camera, the distance in alpha-numeric form of the object from the vehicle, and the type of the object which is in the field of view of the at least one camera.

9. The vehicular vision system according to claim 7 wherein the type of vehicle is one of a car, truck, light-truck, van, motorcycle, sport utility vehicle, and bus.

10. The vehicular vision system according to claim 7 further comprising:
    a display; and
    an image processor coupled to the at least camera for receiving a signal generated by the at least one camera which corresponds to the field of view of the camera, the image processor generating a signal which is provided to the display for displaying the field of view of the at least one camera on the display.

11. The vehicular vision system according to claim 7 wherein the at least one camera comprises first and second side image cameras and a rear image camera.

12. The vehicular vision system according to claim 7, wherein said distance determiner is configured to disable a turning signal of the vehicle in response to the distance being less than a threshold.

13. A vehicular vision system to aid a driver of a vehicle in determining whether to change lanes, comprising:
    at least one camera having a field of view, the at least one camera being positioned on the vehicle such that the field of view corresponds to at least a portion of an area proximate the vehicle;
    an object identifier electrically coupled to the at least one camera, the object identifier identifying an object which is in the field of view of the at least one camera and determining a type of the object; and
    a display electrically coupled to the at least one camera which displays an image generated by said at least one camera and displays said type as text on said display.

14. The vehicular vision system according to claim 13, further comprising a distance determiner electronically coupled to the at least one camera which determines a distance of the object in the field of view of the at least one camera from the vehicle, said distance of the object from the vehicle which is in the field of view of the at least one camera being displayed on said display in alpha-numeric form.

15. The vehicular vision system according to claim 14, wherein said distance determiner is configured to disable a turning signal of the vehicle in response to the distance being less than a threshold.

16. A vehicular vision system to aid a driver of a vehicle in determining whether to change lanes, comprising:
- at least one camera having a field of view, the at least one camera being positioned on the vehicle such that the field of view corresponds to at least a portion of an area proximate the vehicle;
- a distance determiner electronically coupled to the at least one camera which determines a distance of an object in the field of view of the at least one camera from the vehicle; and
- an object classifier electrically coupled to the at least one camera, the object classifier analyzing and classifying a type of the object which is in the field of view of the at least one camera.

17. The vehicular vision system according to claim 16, further comprising a display electrically coupled to the at least one camera which displays an image generated by said at least one camera, the distance in alpha-numeric form of the object from the vehicle, and the type-of the object which is in the field of view of the at least one camera.

18. The vehicular vision system according to claim 17, wherein the type of the object is displayed as text on the display.

19. The vehicular vision system according to claim 16, wherein the type of the object is one of a car, truck, light-truck, van, motorcycle, sport utility vehicle, and bus.

20. The vehicular vision system according to claim 16, wherein said distance determiner is configured to disable a turning signal of the vehicle in response to the distance being less than a threshold.

* * * * *